(12) United States Patent
Betrabet (10) Patent No.: US 7,382,522 B2
(45) Date of Patent: Jun. 3, 2008

(54) GROOVED SUBSTRATE

(75) Inventor: Chinmay S. Betrabet, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 152 days.

(21) Appl. No.: 11/118,209

(22) Filed: Apr. 29, 2005

(65) Prior Publication Data

US 2006/0245040 A1 Nov. 2, 2006

(51) Int. Cl.
*G02F 1/29* (2006.01)
*G02F 1/01* (2006.01)
*G02F 1/03* (2006.01)
*G02F 1/1339* (2006.01)
*G02F 1/1343* (2006.01)

(52) U.S. Cl. ............... 359/316; 359/245; 359/254; 359/279; 349/139; 349/140; 349/141; 349/143; 349/153; 349/156; 349/110; 349/114; 345/87; 313/582

(58) Field of Classification Search ........... 359/296, 359/245, 251, 254, 315, 316, 3, 19, 15, 279, 359/265–275; 349/29, 96, 107, 110, 106, 349/123, 139–141, 143, 130, 155, 156, 158, 349/166, 165, 86, 200–202, 12, 43, 114, 153, 349/187, 190; 345/54, 87, 92, 94, 96; 385/8–10; 313/505, 582; 427/64, 66, 162, 256; 257/774; 438/609

See application file for complete search history.

(56) References Cited

U.S. PATENT DOCUMENTS

| 4,660,938 A | * | 4/1987 | Kazan | 359/245 |
|---|---|---|---|---|
| 4,707,081 A | * | 11/1987 | Mir | 359/254 |
| 4,729,640 A | * | 3/1988 | Sakata | 349/201 |
| 4,850,681 A | * | 7/1989 | Yamanobe et al. | 349/201 |
| 4,854,678 A | * | 8/1989 | Kitano et al. | 359/254 |
| 4,887,104 A | * | 12/1989 | Kitano et al. | 359/246 |
| 5,015,074 A | | 5/1991 | Clerc et al. | |
| 5,150,241 A | * | 9/1992 | Joffre et al. | 349/140 |
| 5,274,481 A | | 12/1993 | Kim | |
| 5,694,188 A | * | 12/1997 | Sano et al. | 349/139 |
| 5,757,131 A | * | 5/1998 | Tsuchiya | 313/582 |
| 5,841,492 A | | 11/1998 | Iwauchi et al. | |
| 6,020,941 A | | 2/2000 | Ma | |
| 6,288,822 B2 | * | 9/2001 | Romanovsky | 359/245 |
| 6,297,899 B1 | * | 10/2001 | Romanovsky | 359/245 |
| 6,310,712 B1 | * | 10/2001 | Romanovsky | 359/245 |
| 6,381,060 B1 | * | 4/2002 | Romanovsky | 359/245 |
| 6,486,996 B1 | * | 11/2002 | Romanovsky | 359/245 |
| 6,784,953 B2 | | 8/2004 | Liang et al. | |
| 6,833,943 B2 | | 12/2004 | Liang et al. | |
| 6,850,355 B2 | | 2/2005 | Liang et al. | |
| 6,864,945 B2 | * | 3/2005 | Fujimori et al. | 349/156 |
| 6,897,564 B2 | * | 5/2005 | Kim et al. | 257/774 |
| 7,218,429 B2 | * | 5/2007 | Batchko | 359/15 |
| 2002/0021483 A1 | | 2/2002 | Katase | |
| 2004/0201878 A1 | | 10/2004 | Agrawal et al. | |

* cited by examiner

Primary Examiner—Loha Ben (57) ABSTRACT

Various embodiments of a grooved substrate having electrical conductors and an electro optical material are disclosed.

43 Claims, 6 Drawing Sheets

GROOVED SUBSTRATE

BACKGROUND

Various devices such as displays may include materials that exhibit changes in response to electrical charges or electrical fields. In many circumstances, the rate at which such materials change in response to such charges or fields may be too slow. In other instances, the degree of change may be insufficient. In still other instances, the voltages or charges to effectuate the desired change may be too high.

DETAILED DESCRIPTION OF EXAMPLE EMBODIMENTS

Figure 1:
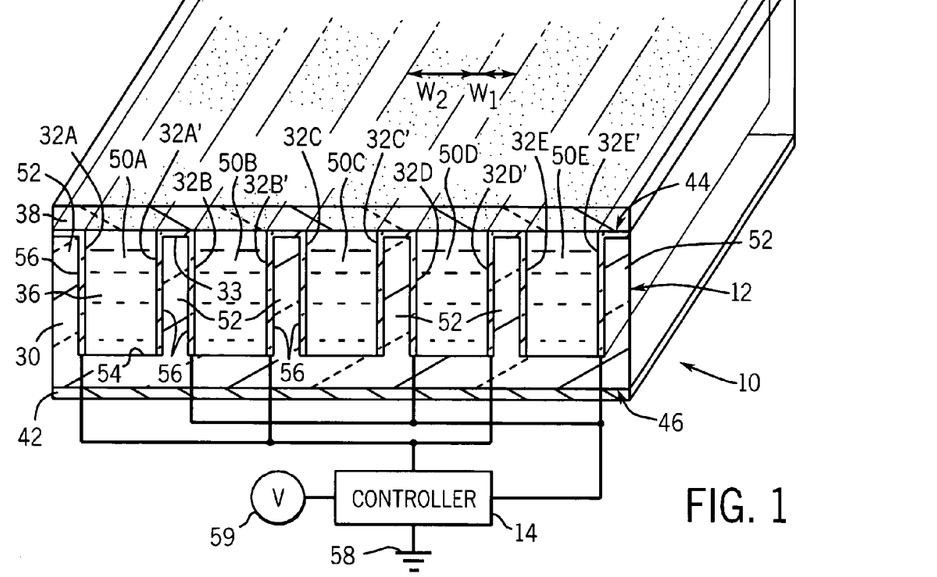
FIG. 1 is a perspective sectional view of an electro optical system including an electro optical device according to one example embodiment.

FIG. 1 schematically illustrates electro optical system 10 which generally includes electro optical device 12 and controller 14. Electro optical device 12 comprises a device configured to change its optical qualities or characteristics in response to voltages controlled and provided by controller 14. In one embodiment, electro optical device 12 may comprise a projection screen. In another embodiment, device 12 may comprise a display screen. Electro optical device 12 generally includes substrate 30, electrodes or conductors 32A, 32A', 32B, 32B', 32C, 32C', 32D, 32D', 32E and 32E' (collectively referred to as conductors 32), electro optical material 36, cover 38 and reflector 42. Substrate 30 comprises one or more layers of transparent or translucent material having a first face 44 and a second opposite face 46. Face 44 faces cover 38 and includes grooves 50A, 50B, 50C, 50D and 50E (collectively referred to as grooves 50) and dividers 52. Each of grooves 50 generally includes a floor 54 and a pair of opposing sidewalls 56 projecting from each floor 54. Floor 54 and sidewalls 56 of each of grooves 50 forms an elongate channel in which electro optical material 36 is received and contained. Although each of grooves 50 is illustrated as being generally rectangular in shape, each of grooves 50 may alternatively have other cross-sectional shapes.

Dividers 52 extend between grooves 50 and provide sidewalls 56 of grooves 50. Dividers 52 further support cover 38 above and opposite to floor 54 of grooves 50. In a particular example shown, each of dividers 52 has a width $W_1$ less than a width $W_2$ of that portion of each of grooves 50 containing electro optical material 36. As a result, grooves 50 and the electro optical material 36 contained within grooves 50 extend across a majority of the overall surface area of face 44 and of device 12. Thus, changes in the optical characteristics of electro optical material 36 in response to voltages applied by controller 14 also results in changes to the optical nature of the majority of the surface area of face 44 and of device 12.

According to one example embodiment, each of grooves 50 has a width $W_2$ less than or equal to about 200 microns, of greater than or equal to about 1 microns and nominally about 20 microns. Each of grooves 50 has a depth of at least about 10 microns, of less than or equal to about 150 microns and nominally about 75 microns. According to one example embodiment, dividers 52 have a width $W_1$ of less than or equal to about 40 microns and nominally 10 microns. In other embodiments, the widths of grooves 50 and dividers 52 as well as the depths of grooves 50 may have other values.

Conductors 32 extend along each of grooves 50 and are electrically connected to either ground 58 or a voltage source 59 by controller 14. Conductors 32 extend along each of grooves 50 and are electrically separated or isolated from one another such that conductors 32 along each groove 50 may be charged with distinctive voltages to also create an electric field within the respective groove 50 and across electro optical material 36. In the particular example shown, conductors 32 are formed on sidewalls 56 of grooves 50 to create an electrical field through electro optical material 36 in a direction substantially parallel to face 44 and cover 38. In other embodiments, conductors 32 may alternatively extend along each of grooves 50 at other locations.

According to one example embodiment, consecutive conductors 32 along consecutive grooves 50 are electrically connected to one another across the divider 52. For example, as shown in FIG. 1, conductor 32A' is electrically connected to conductor 32B by an intermediate connecting portion 33. Connecting portion 33 extends across the divider 52 extending between grooves 50A and 50B. According to one example embodiment, conductors 32A', 32B and connecting portion 33 are integrally formed as part of a single unitary layer or coating which extends from groove 50A, across the intermediate divider 52 to within groove 50B. Conductors 32B' and 32C, conductors 32C' and 32D' and conductors 32D' and 32E are similarly connected. Because consecutive conductors 32 are electrically connected to one another by connecting portions 33 extending across dividers 52, fabrication of device 12 is facilitated. In addition, charging of conductors 32 is also facilitated. In other embodiments, conductors 32 may independently extend along each of grooves 50 and may be independently connected to ground 58 or a voltage source 59 by controller 14.

Electro optical material 36 comprises a material configured to exhibit varying optical characteristics in response to an applied electrical field or charge. In the one example embodiment, material 36 comprises a material configured to exhibit changes in translucency or opacity in response to an electrical field applied by conductors 32. For example, in one embodiment, material 36 is configured to be clear and translucent in response to an applied charge by conductors 32 and to be light absorbing or substantially opaque in the absence of a charge or electrical field. In one embodiment, material 36 comprises an electrochromic material. In one embodiment, material 36 comprises liquid crystal material such as a polymer dispersed liquid crystal (PDLC), quantum dots, suspended polarizable particles in a dielectric medium, cholesteric liquid crystals, or electrophoretic particles dispersed in a suitable medium. In still another embodiment, material 36 may comprise a material configured to absorb different wave lengths of light depending upon the voltage or electrical field applied by conductors 32. As a result, in some embodiments, material 36 may have a first color in the absence of an electrical field and may be translucent or have a second color in the presence of an electrical field formed by conductor 32.

Cover 38 generally comprises a layer, panel or other structure extending across substrate 30 opposite to floors 54 of grooves 50. Cover 38 is configured to contain electro optical material 36 within each of grooves 50. In one particular embodiment, cover 38 is translucent, allowing light to pass through cover 38. In another embodiment, cover 38 may have selected portions that are translucent and selected portions that are opaque or that absorb particular wavelengths of light.

Reflector 42 comprises a layer, panel and other structure having a light reflective surface extending along face 46 of substrate 30. Reflector 42 reflects light that has passed through cover 38, through substrate 30 and through conductors 32, which are transparent, and through material 36 when material 36 is translucent as a result of an electric field being applied across material 36 or when material 36 configured to be partially translucent even in the absence of an electrical field. In one particular embodiment, reflector 42 may be configured to reflect all wavelengths of visual light. In another embodiment, reflector 42 may be configured to absorb certain wavelengths of light such that it is colored. In one embodiment, reflector 42 may have a common reflectivity or color across its entire face. In another embodiment, reflector 42 may have distinct portions having different colors or different levels of reflectivity. In other embodiments, reflector 42 may be omitted where substrate 30 is itself reflective or colored. In other embodiments, reflector 42 may be omitted and substrate 30 as well as conductors 32 may be formed from opaque materials where electro optical material 36 is not transparent in the presence of an applied electrical field but exhibits a change in the wavelengths of light that are absorbed by material 36 in response to an applied electrical field.

Controller 14 generally comprises a processing unit configured to selectively connect conductors 32 to ground 58 and voltage source 59. As shown as FIG. 1, controller 14 is configured to electrically connect conductors 32A', 32B, 32C', 32D and 32E', simultaneously, to either ground 58 or voltage source 59. Controller 14 is also configured to simultaneously connect conductors 32A, 32B', 32C, 32D' and 32E to either ground 58 or voltage source 59. By providing distinct voltages to conductors 32 of a groove 50, controller 14 may create an electrical field across electro optical material 36 contained within the groove to vary optical characteristics of material 36. In another embodiment, controller 14 may include electrical switching devices, such as transistors or metal-insulator-metal (MIM) devices. In one embodiment, controller 14 may comprise a separate structure electrically connected to device 12 or may be embedded or formed as part of device 12.

Overall, electro optical device 12 may provide a cost effective screen or other structure configured to exhibit different optical characteristics, such as color or reflectivity, in response to different applied voltages. Because electro optical material 36 is contained within grooves and because conductors 32 extend along sidewalls of such grooves, the space in between conductors 32 is reduced. As a result, a stronger electric field may be applied across electro optical material 36 with a lesser applied voltage to conductors 32. The stronger electric field may allow use of electro optical materials 36 having greater light absorption and providing darker colors without decreasing responsivity that may otherwise result from the use of such materials due to their generally greater viscosity. Because lower voltages may be used to form similar electric fields across material 36, energy may be saved and the useful life of device 12 may be increased by reducing the likelihood of material breakdown brought about by use of high voltages.

Figure 2:
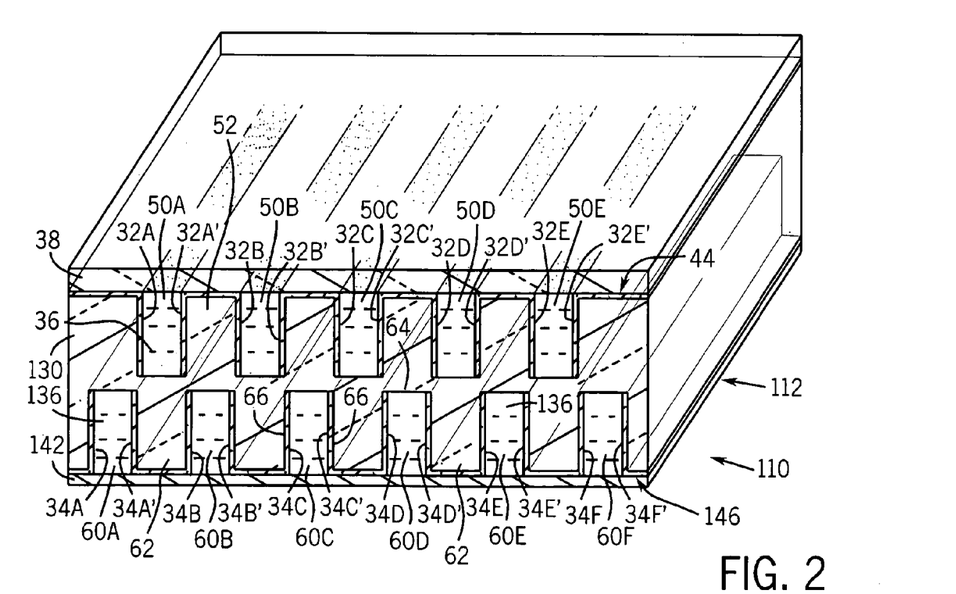
FIG. 2 is a perspective sectional view of another embodiment of the electro optical device of FIG. 1 according to one example embodiment.

FIG. 2 schematically illustrates electro optical system 110, another embodiment of electro optical system 10. Electro optical system 110 generally includes electro optical device 112. Electro optical device 112 is similar to electro optical device 12 except that electro optical device 112 includes substrate 130 and cover 142 in lieu of substrate 30 and reflector 42, respectively. Electro optical device 112 additionally includes electrodes or electrical conductors 34A, 34A', 34B, 34B', 34C, 34C', 34D, 34D', 34E, 34E', 34F, 34F' (collectively referred to as conductors 34), and electro optical material 136. Substrate 130 is similar to substrate 30 except that substrate 130 includes face 146 in lieu of face 46.

Face 146 of substrate 130 is substantially similar to face 44 except that face 146 includes grooves 60A, 60B, 60C, 60D, 60E and 60F (collectively referred to as grooves 60) and dividers 62. Grooves 60 comprise channels extending along face 146. Each of grooves 60 includes a floor 64 and a pair of opposing sidewall 66. Grooves 60 function as receptacles for containing electro optical material 136 along face 146. In a particular example shown, grooves 60 extend parallel to one another along face 146 and are separated by dividers 62. In the particular example shown, grooves 60 and dividers 62 are offset and out of phase with grooves 50 and dividers 52 of face 44. In particular, each of grooves 60 along face 146 extends generally opposite to one of dividers 52. Likewise, each of dividers 62 along face 146 extends along and generally opposite to one of grooves 50 along face 44. As a result, charge responsive material 136 is contained and extends across substantially the entirety of substrate 130 and the entirety of electro optical device 12.

According to one example embodiment, each of grooves 60 has a width of less than or equal to about 200 microns, greater than or equal to about 1 micron and nominally 20 microns. Each of grooves 60 also has a depth of less than or equal to about 150 microns, greater than or equal to about 10 microns and nominally 75 microns. According to one example, dividers 52 and 62 of substrate 130 have a width of at least about 1 microns, less than or equal to about 40 microns and nominally 10 microns. Although grooves 50 and 60 are illustrated as having common widths and depths, in other embodiments, grooves 50 and 60 may have differing widths and/or depths.

Electrical conductors 34 are similar to electrical conductors 32 except that electrical conductor 34 extend along each of grooves 60 on face 146. Like electrical conductors 32, electrical conductors 34 extend along opposite sidewalls 66 of grooves 60 and are configured to be charged to distinct voltages such that an electric field is created across grooves 60. In lieu of being formed along sidewalls 66, conductors 34 may alternatively extend along other portions of grooves 60 while being electrically separated or isolated from one another along grooves 60. For example, in other embodiments, electrical conductors 34 may alternatively extend along floor 64 and upon cover 142. Like electrical conductors 32, consecutive pairs of electrical conductors 34 are provided by a single layer of conductive material continuously extending from one of grooves 60, across an intermediate dividers 62 and into another consecutive groove 60. In other embodiments, conductors 34 may be independently formed upon or mounted to substrate 130 or to other surfaces along grooves 60.

Electro optical material 136 is similar to electro optical material 36. In particular, electro optical material 136 comprises a material configured to exhibit varying optical characteristics in response to an applied electrical field or charge. In the example embodiment shown, material 136 comprises a material configured to exhibit changes in translucency or opacity in response to an electrical field applied to conductors 34. For example, in one embodiment, material 136 is configured to be clear and translucent in response to a sufficient charge applied by conductors 34 and to be light absorbing or substantially opaque in the absence of a charge or electric field. In one embodiment, material 136 comprises a liquid crystal material such as PDLC. In still another embodiment, material 136 may comprise a material configured to absorb different wavelengths of light depending upon the voltage or electric field applied by conductors 34. In some embodiments, material 136 may have a first color in the absence of an electrical field and may be translucent or have a second color in the presence of an electrical field formed by conductors 34. In one embodiment, electro optical material 136 is identical to electro optical material 36. In another embodiment, electro optical material 136 is distinct from electro optical material 36 such that electro optical material 136 exhibits a distinct color as compared to electro optical material 36 in the absence of an electrical field. In yet another embodiment, such electro optical material 136 may also have another color rather than being translucent as a result of an applied electrical field.

Cover 142 comprises one or more layers, panels or other structures extending along face 146 of substrate 130 opposite to floors 64 of grooves 60. Cover 142 is configured to contain electro optical material 136 within each groove 60. In one particular embodiment, cover 142 is further configured to reflect light that is passed through cover 38, through substrate 130, through conductors 32, 34, which are transparent, and through material 36 when material 36 is translucent as a result of an electrical field being applied across material 36 or through material 136 when material 136 is translucent as a result of an electric field being applied across material 136. In one embodiment, cover 142 may have a common reflectivity or color across its entire face. In another embodiment, cover 142 may have distinct portions having different colors or different levels of reflectivity.

Figure 3:
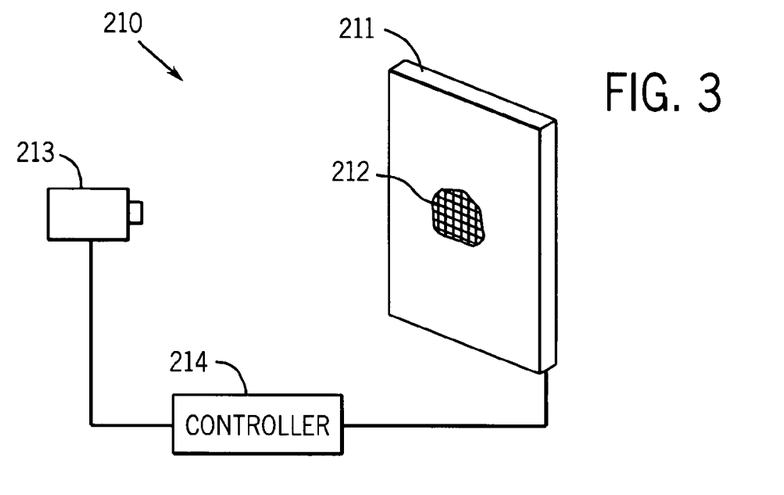
FIG. 3 is a schematic illustration of another embodiment of the electro optical system of FIG. 1 including a screen including another embodiment of the electro optical device of FIG. 1 according to one example embodiment.

FIG. 3 schematically illustrates electro optical system 210 which includes another embodiment of electro optical device 112 (shown in FIG. 2). System 210 generally includes screen 211 having a multitude of individual pixels 212, projector 213 and controller 214. Screen 211 is configured to selectively absorb and/or reflect light by each pixel 212 in response to control signals from controller 214. In one embodiment, screen 211 selectively adjusts absorption and/or reflection of light by each of pixels 212 to form a black-and-white or grayscale image.

Projector 213 generally comprises a device configured to project light upon screen 211, wherein an observer views light reflected from screen 211. In one embodiment, projector 213 is configured to project a color image including chrominance information of an image upon screen 211. Pixels 212 of screen 211 reflect and/or absorb the incident light from projector 213 and provide an observer with a reflected color image. In one embodiment, projector 213 may comprise a digital light processing (DLP) projector. In other embodiments, projector 213 may comprise other projection devices.

Controller 214 comprises a processing unit in communication with both screen 211 and projector 213. For purposes of this disclosure, the term "processing unit" shall mean a conventionally known or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. Controller 214 is not limited to any specific combination of hardware circuitry and software, nor to any particular source for the instructions executed by the processing unit. In the particular embodiment illustrated, controller 214 generates control signals coordinating the operation of screen 211 and projector 213. In other embodiments, projector 213 may be omitted where the image presented by screen 211 is sufficient.

Figure 4A:
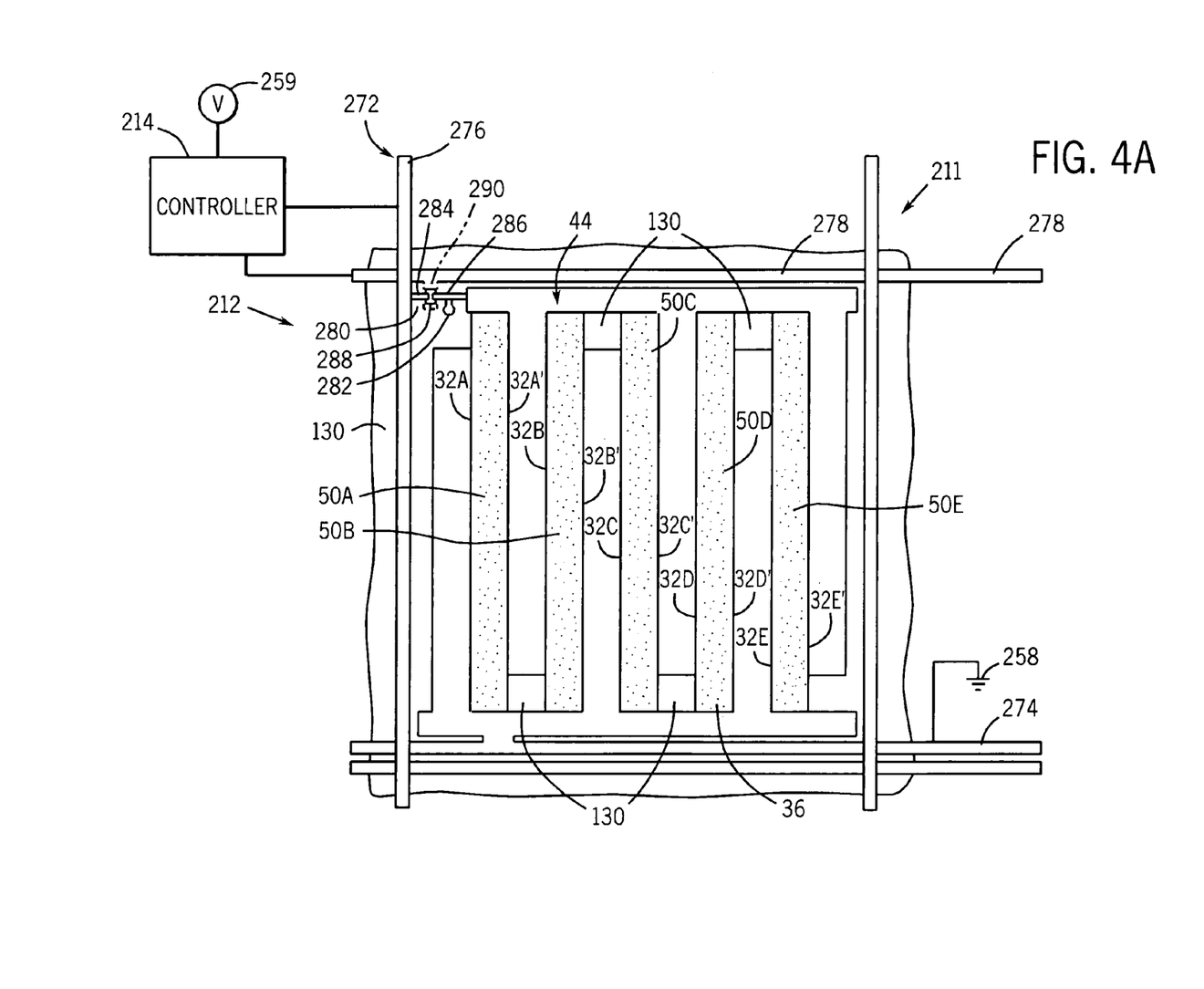
FIG. 4A is a fragmentary top plan view of the screen of FIG. 3 according to one example embodiment.
Figure 4B:
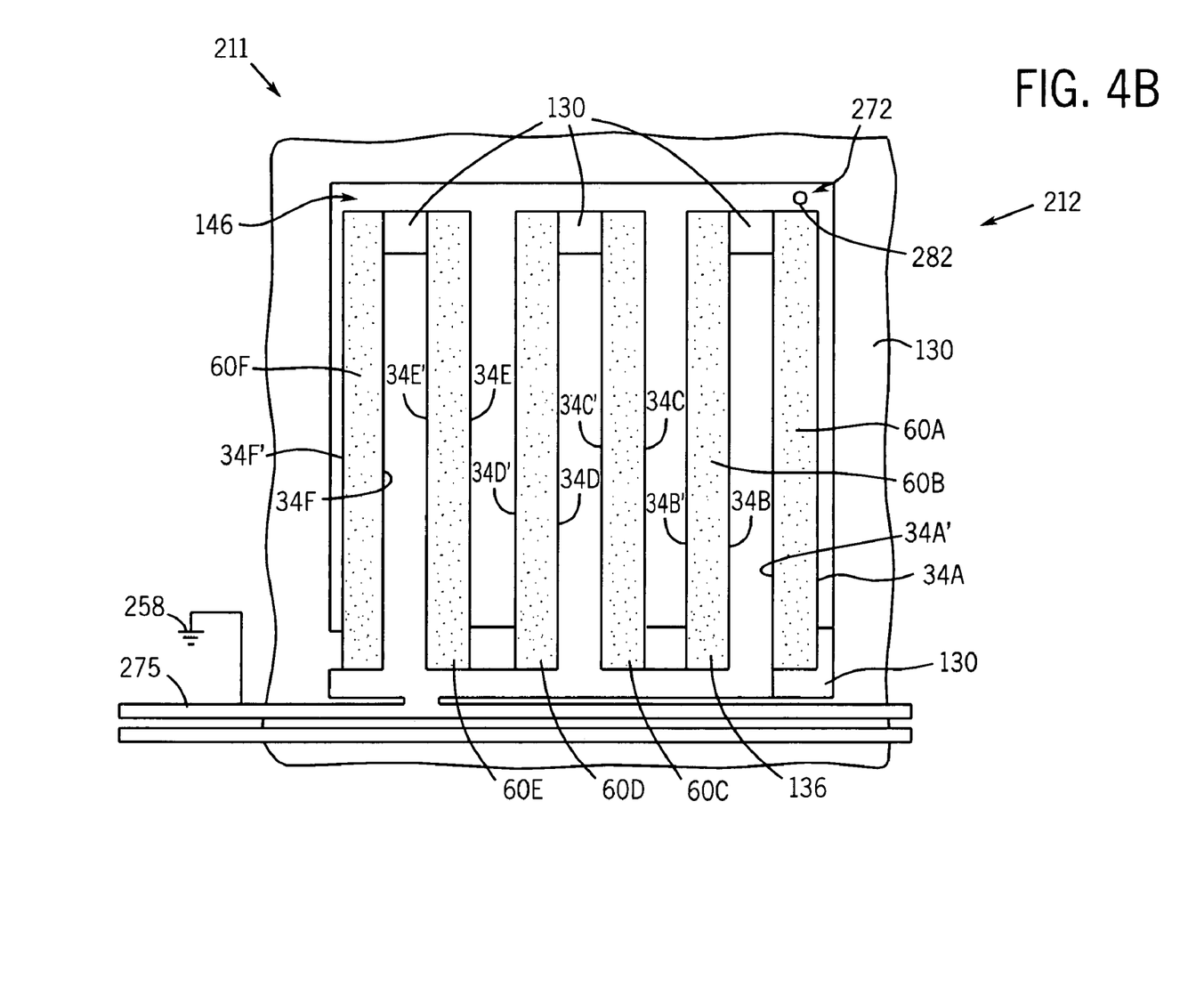
FIG. 4B is a fragmentary bottom plan view of the screen of FIG. 3 according to one example embodiment.

FIGS. 4A and 4B are greatly enlarged views of screen 211 illustrating an individual pixel 212. Each pixel 212 is similar to electro optical device 112 (shown in FIG. 2) except that substrate 130 comprises a continuous sheet, panel or structure serving as a substrate for a multitude of pixels 212. In particular, each pixel 212 includes an allocated set of grooves 50 upon face 44 of substrate 130 and offset set of grooves 60 on face 146 of substrate 130 (as shown in FIG. 4B). In other embodiments, each of pixels 212 may be individually formed, supported or mounted relative to adjacent pixels 212.

As further shown by FIG. 4A, screen 211 additionally includes an active matrix control arrangement 272 which includes ground lines 274, 275 (shown in FIG. 4B), data line 276, signal line 278 and switching devices 280. Ground line 274 comprises a trace or line of electrically conductive material formed upon face 44 of substrate 130. Ground line 274 is electrically connected to each of conductors 32A, 32B', 32C, 32D' and 32E. Ground line 274 is further electrically conducted to ground 258.

As shown by FIG. 4B, ground line 275 comprises a trace or line of electrically conductive material extending along face 146 of substrate 130. Ground line 275 is electrically connected to ground 258 and is electrically connected to each of conductors 34A', 34B, 34C', 34D, 34E' and 34F. Although ground line 275 is illustrated as being connected to ground 258 independent of ground line 274, in other embodiments, ground line 275 may be connected to ground line 274 by an electrically conductive via extending between faces 44 and 146.

As shown by FIG. 4A, data line 276 comprises a line or trace of electrically conductive material formed upon face 44 of substrate 130. Data line 276 is electrically connected to a voltage source 259 in a selective manner by controller 214. Data line 276 supplies a non-zero voltage to each of pixels 212 of screen 211. In particular, data line 276 is configured to charge each of conductors 32A', 32B, 32C', 32D and 32E' upon face 44 when switching device 280 is in a connecting or conducting state. Data line 276 further charges electrical conductors 34A, 34B', 34C, 34D', 34E and 34F' on face 46 (shown in FIG. 4B) when switching device 280 is in a connecting or conducting state.

Signal line 278 comprises an electrically conductive line or trace formed upon or otherwise supported by substrate 130 and extending along the face 44. Signal line 278 is electrically connected to switching devices 280 of each of pixels 212 of screen 211. Signal line 278 is electrically connected to controller 214 and transmits control signals, in the form of signal voltages, from controller 214 to switching device 280. Such control signals from controller 214 actuate switching device 280 between a connecting or conducting state and a disconnected or non-conducting state.

Switching device 280 comprises a device configured to change between a connecting or electrically conductive state and a disconnected, conducting state in response to signal voltages received via signal line 278. As a result, switching device 280 enables conductors 32A', 32B, 32C', 32D and 32E' to be selectively connected to data line 276. As shown by FIG. 4B, an output side of switching device 280 is further electrically connected to conductors 34A, 34B', 34C, 34D', 34E and 34F' by an electrically conductive via 282 passing through substrate 130. As a result, switching device 280 further enables selective connection of electrical conductors 34A, 34B', 34C, 34D', 34E and 34F' on face 46 to data line 276.

According to one example embodiment, switching device 280 comprises a thin film transistor having a source electrode 284 electrically connected to data line 276, a drain electrode 286 electrically connected to conductors 34A, 34B', 34C, 34D', 34E and 34F' (shown in FIG. 4B) and to conductors 32A', 32B, 32C', 32D and 32E' (shown in FIG. 4A), a semiconductive material 288 interposed between source electrode 284 and drain electrode 286, and a gate 290 (shown in phantom) electrically connected to signal line 278 and configured to create electric field across the semiconductive material 288. In other embodiments, switching device 280 may comprise a metal-insulator-metal switching device or other switching devices.

Controller 214 comprises a processing unit configured to generate control signals in the form of electrical signals for each of pixels 212 of screen 211. In the particular embodiment illustrated in FIGS. 4A and 4B in which screen 211 includes active matrix control arrangement 272, controller 214 transmits electrical signals to each of switching devices 280 by signal line 278 to actuate switching device 280 between the connected and disconnected states. In the disconnected state, data line 276 is disconnected from conductors 32 such that a substantial electrical field is not created across electro optical material 36. In one particular embodiment, the absence of charge across material 36 results in material 36 remaining in a light absorbing, generally opaque state. Because grooves 50 are offset and out of phase with grooves 60, a substantial portion of the surface of pixel 212 is light absorbing or opaque.

In a connected or conducting state, switching device 280 selectively connects data line 276 to conductors 32 such that an electrical field is created across electro optical material 36. In the presence of a sufficient electric field, material 36 becomes at least partially translucent state, allowing light to pass through material 36 and each of grooves 50, 60. Because grooves 50 are offset and out of phase with grooves 60, a substantial portion of the surface area of pixel 212 is at least partially translucent. In one embodiment in which cover 40 is reflective, the light passing through grooves 50, 60 is permitted to reflect off of cover 40 and back through the remainder of pixel 212. In the particular embodiment in which cover 142 (shown in FIG. 2) is colored so as to absorb certain wavelengths of light, light reflected from cover 40 exhibits the color.

Although pixel 212 is illustrated as being configured to charge conductors on face 44 at substantially the same time as conductors 34A, 34B', 34C, 34D', 34E and 34F' on face 146, in other embodiments, one or more of pixels 212 may alternatively be configured to facilitate charging of conductors 32A', 32B, 32C', 32D and 32E' on face 44 independently of conductors 34A, 34B', 34C, 34D', 34E and 34F' on face 146. For example, in lieu of including a single switching device 280 for both of faces 44 and 146, each pixel 212 may alternatively include a first data line 276, a first signal line 278 and a first switching device 280 for those conductors on face 44 and a second data line 276, a second signal line 278 and a second switching device 280 for those conductors on face 146. In such an embodiment via 282 may be omitted. In such an alternative embodiment, electro optical material 36 on face 44 may be actuated between various optical states independent of electro optical material 136 on face 146 and vice versa. In still other embodiments, screen 211 may alternatively include a passive matrix control arrangement in which switching devices 280 are not provided for each of pixels 212 proximate to each of pixels 212.

Figure 5:
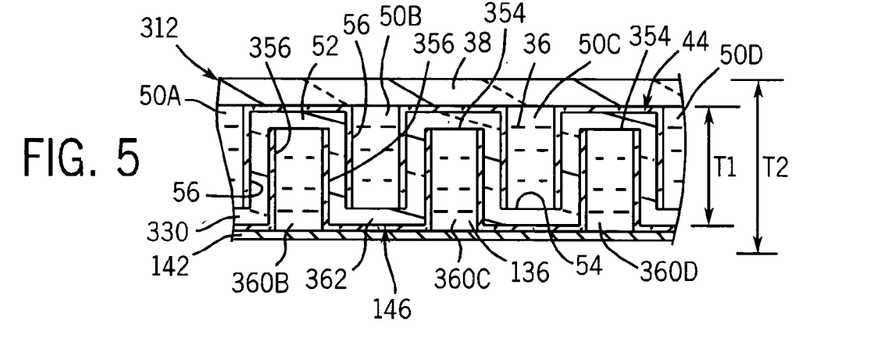
FIG. 5 is a fragmentary sectional view of another embodiment of the electro optical device of FIG. 1 according to one example embodiment.

FIG. 5 is a fragmentary cross-sectional view schematically illustrating electro optical device 312, another embodiment of electro optical device 12 shown as described with respect to FIG. 1. Electro optical device 312 is similar to electro optical device 112 (shown in FIG. 2) except that device 312 includes substrate 330 in lieu of substrate 130. Substrate 330 is similar to substrate 130 except that face 146 of substrate 330 includes grooves 360B, 360C, 360D, (collectively referred to as grooves 360) which are interdigitated or interleaved with grooves 50 of face 44. Grooves 360 are similar to grooves 60 of substrate 130 except that grooves 360 each have a floor 354 and sidewalls 356 substantially contained within dividers 52 of face 44 such that sidewalls 356 extend opposite to sidewalls 56 of grooves 50. Likewise, floor 54 and sidewalls 56 of grooves 50 are substantially located within dividers 362 along face 146. This interdigitation or interleaving of grooves 50 and 360 may serve to reduce a thickness $T_1$ of substrate 330, reducing material of substrate 330. This arrangement may also reduce the overall thickness $T_2$ of electro optical device 312.

Figure 6:
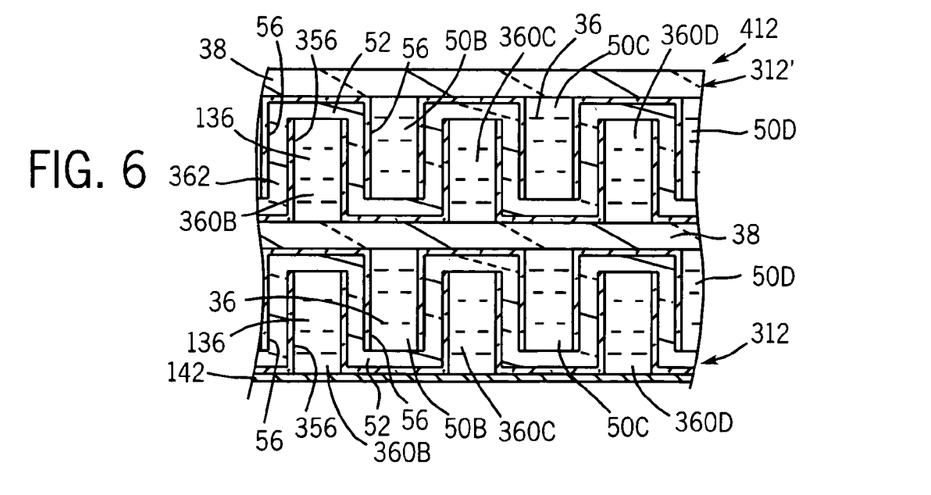
FIG. 6 is a fragmentary sectional view of another embodiment of the electro optical device of FIG. 1 according to one example embodiment.

FIG. 6 is a fragmentary cross-sectional view of electro optical device 412, another embodiment of electro optical device 312 shown in FIG. 5. Electro optical device 412 includes electro optical device 312 and additionally includes electro optical device 312' stacked adjacent to electro optical device 312. Electro optical device 312' is similar to electro optical device 312 except that electro optical device 312' omits cover 142 and is instead bounded by cover 38 of electro optical device 312. In other embodiments, electro optical device 312' may alternatively include a transparent cover, wherein such a cover is secured or otherwise mounted adjacent to cover 38 of electro optical device 312.

According to one example embodiment, electro optical material 36 and 136 of electro optical device 312 comprise a material configured to respond to charge in a first manner while electro optical material 136 and 36 of electro optical device 312' device material configured to respond to electrical charge in a second distinct manner. In one embodiment, electro optical material 36 and 136 of electro optical device 312 actuate between a first colored opaque state and a clear translucent state. At the same time, electro optical material 36 and 136 of electro optical device 312' actuate between a clear state and a second colored state distinct from the first colored state. As a result, when electrical charge is applied to electro optional device 312 such that its electro optical materials 36 and 136 are transparent and when charge is also applied to electro optical materials 36 and 136 of electro optical device 312 such that its electro optical materials 36 and 136 are also transparent, light may be reflected off of the reflective surface of reflector 42 of electro optical device 312. Alternatively, when charge is applied to electro optical materials 36 and 136 of electro optical device 312' such that its materials 36 and 136 are transparent and no electrical fields are applied across electro optical materials 36 and 136 of electro optical device 312, the first colored light is reflected from electro optical device 412. As yet another alternative, no charge may be applied to electro optical materials 36 and 136 of electro optical device 312' such that the second colored light is reflected by electro optical device 412. Although electro optical device 412 is illustrated as including two stacked electro optical devices 312 and 312', electro optical device 412 may alternatively include a greater number of such stacked electro optical devices 312 for enhanced color versatility. Although electro optical device 412 is illustrated as including stacked electro optical devices 312 and 312', electro optical device 412 may alternatively include stacked electro optical devices 12 or 112 shown in FIGS. 1 and 2.

Figure 7:
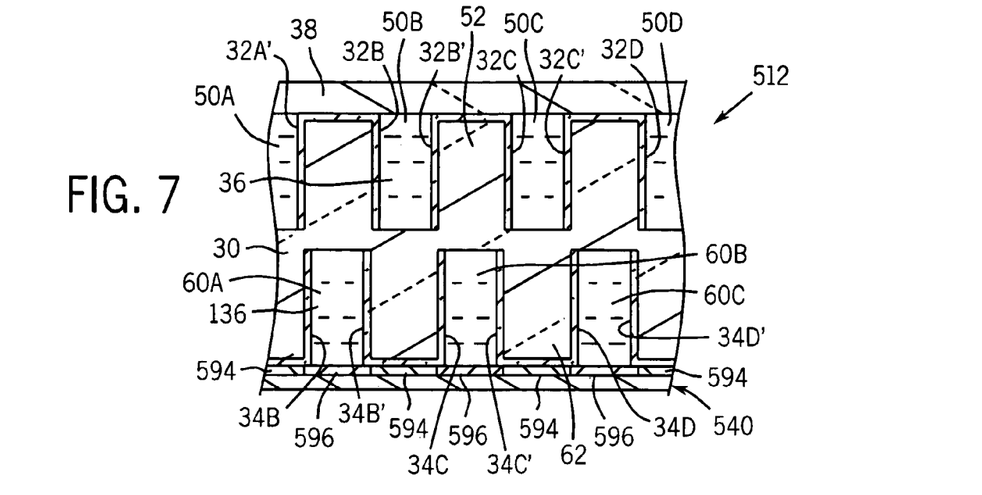
FIG. 7 is a fragmentary sectional view of another embodiment of the electro optical device of FIG. 1 according to one example embodiment.

FIG. 7 is a fragmentary sectional view schematically illustrating electro optical device 512, another embodiment of electro optical device 12 shown in FIG. 1. Electro optical device 512 is similar to the electro optical device 112 except that electro optical device 512 includes reflector 540 in lieu of cover 142. Reflector 540 is similar to cover 142 except that reflector 540 includes colored reflecting surfaces 594 and 596. Reflecting surfaces 594 face cover 38 and are configured to absorb a first range of wave lengths such that reflectors 594 reflect a first color. Reflecting surfaces 594 each generally extend opposite to and along grooves 50. As a result, when electric field is formed across electro optical material 36 in grooves 50, such that electro optical material 36 is translucent, light reflected from reflective surfaces 594 has a first color.

Reflecting surfaces 596 comprise reflective surfaces configured to absorb a second range of wave lengths such that light reflected from surfaces 596 has a second color distinct from the first color reflected from surfaces 594. Surfaces 596 extend opposite to and along each of grooves 60. As a result, when an electrical field is formed across electro optical material 136 contained within grooves 60, such that electro optical material 136 is translucent, light is permitted to pass through electro optical material 136 and to be reflected off of reflectors 596. The light reflected off of reflective surfaces 596 has the second color.

Electro optical device 512 enables the selective reflection of multiple colors. In particular, a controller, such as controller 214 (shown and described with respect to FIG. 4) may be configured to operate in a first state in which electrical fields are formed across material 36 but not across material 136 resulting in electro optical device 512 reflecting light of the first color. By forming an electric field across electro optical material 136 and not across electro optical material 36, controller 214 (shown in FIG. 4A) may cause electro optical device 512 to reflect light of the second color. By causing electrical fields to be applied across both electro optical materials 36 and 136, controller 214 may cause electro optical device 512 to reflect light of both the first color and the second color which may combine to form a third color. When an electric field is not applied across either of electro optical materials 36 and 136, electro optical device 512 may be black or may reflect one or more additional colors depending upon light absorption characteristics of electro optical materials 36 and 136 in the absence of an electric field.

Figure 8A:
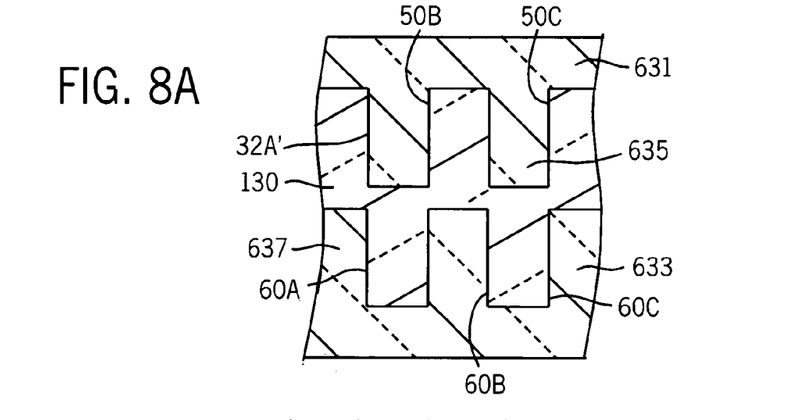
FIGS. 8A through 8C illustrate one example of a process for forming the electro optical device of FIG. 2 according to one example embodiment.
Figure 8B:
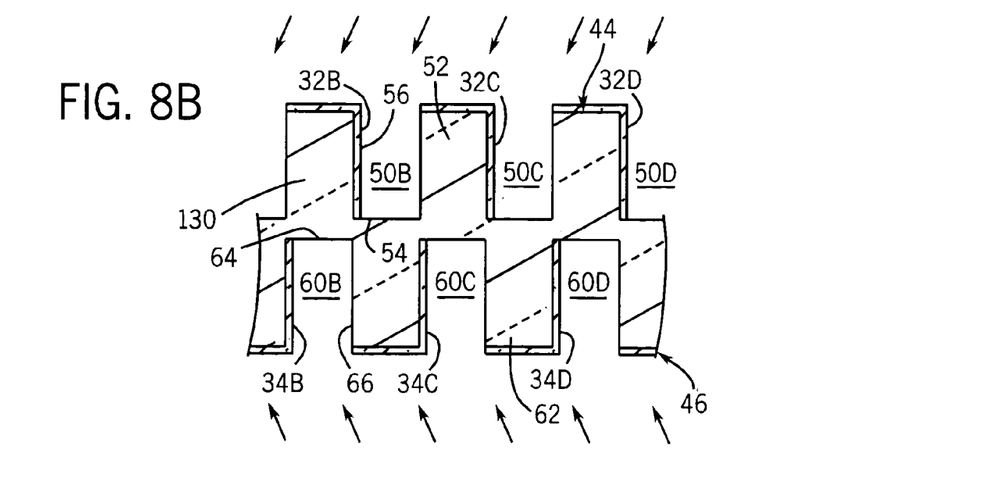
Figure 8C:
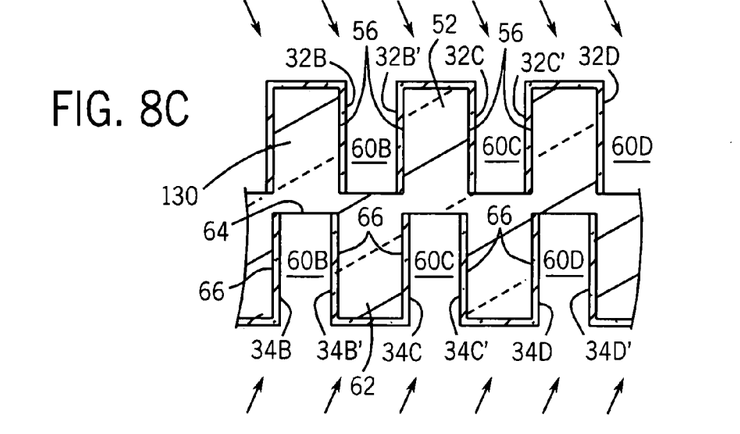

FIGS. 8A through 8C are fragmentary sectional views schematically illustrating one example method for forming electro optical device 112 shown and described with respect to FIG. 2. As shown by FIG. 8A, substrate 130 may be formed by embossing or imprinting upon a sheet, layer or mass of embossable material to form grooves 50 and 60. In one embodiment, the embossable material may comprise a polymeric material in an embossable state such that once embossed, it retains its configuration until solidification. In another embodiment, the embossable material may comprise a material which while being embossed is cured to maintain its shape. For example, in one embodiment, embossing material forming substrate 130 may comprise an optically transparent UV curable dielectric resin (e.g., Norland Optical Products NOA 83H). As a result of application of UV illumination, the shape of substrate 130 and the configuration of grooves 50 and 60 become stabilized.

In one embodiment, embossers 631 and 633 having groove-forming projections 635 and 637, respectively, that are brought into engagement with embossable material of substrate 130. Projection 635 form grooves 50 while projections 637 form grooves 60. In the particular example shown, embossers 631 and 633 are substantially transparent to UV wave lengths. Once embossers 631 and 633 have been positioned into the material of substrate 130 such that grooves 50 and 60 are formed, UV illumination is applied through embossers 631 and 633 to cure and solidify or stabilize the shape of substrate 130 while embossers 631 and 633 are in place. Thereafter, embossers 631 and 633 are separated from substrate 130 to expose and reveal grooves 50 and 60.

In other embodiments, grooves 50 and 60 may be formed by other fabrication processes. For example, in other embodiments, grooves 50 and 60 may be formed by laser ablation, etching processes, ion milling or by mechanical removal techniques such as sawing. In lieu of forming grooves 50 and 60 by removing material, grooves 50 and 60 may alternatively be formed by additive processes in which material is applied to substrate 130 to form dividers 52 and 62 and to thereby form grooves 50 and 60. In still other embodiments, substrate 130 and its grooves 50, 60 may be molded.

FIGS. 8B and 8C illustrate one example process for forming electrical conductors 32 and 34 along each of grooves 50 and 60. As shown by FIG. 8B, a transparent conductive coating may be sputter-deposited upon faces 44 and 46 of substrate 130 at an angle to the grooves such that the inside surfaces or walls 56 and 66 of grooves 50 and 60, respectively, are coated while at least portions of floors 54 and 64 remain uncoated with the conductive material. As shown by FIG. 8C, the transparent conductive coating is further sputter-deposited upon substrate 130 at an angle an opposite direction to deposit the conductive coating on the other in sidewalls 56, 66 of grooves 50 and 60, respectively, while not coating at least a portion of floors 54 and 64. As a result, a transparent conductive coating extends along the inside wall 56 of one of grooves 50, 60, across an intermediate divider 52, 62 and into and along the inside wall 56 of a consecutive groove 50, 60. The conductive coating extending across dividers 52, 62 is electrically isolated from the conductive coating extending across adjacent dividers 52, 62. The aforementioned process reduces the need for photolithographically defining conductors 32 and 34 upon substrate 130. In still other embodiments, conductors 32 and 34 may be formed upon substrate 130 using photolithography or other techniques.

Once conductors 32 and 34 have been formed, grooves 50 and 60 are filled with one or more electro optical materials 36, 136 and cover 38 and cover 142 are attached to substrate 130. According to one example embodiment, the transparent conductive coating forming conductors 32 and 34 may comprise indium tin oxide. In other embodiments the transparent conductive coating may comprise other materials such as zinc oxide, tin oxide, zinc tin oxide, copper indium oxide, strontium copper oxide, cadmium oxide and thin layers of metals such as Al, Pt, Ag, Au, Cu. According to one example embodiment, the electro optical material comprises an electro-chromic material such as viologen. One example of such an electro-chromic material is BHE 4560 commercially available from Bayer.

Figure 9:
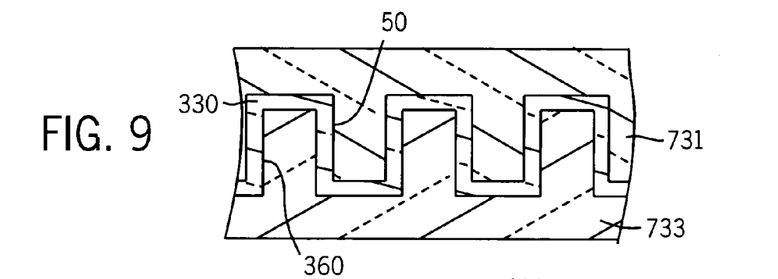
FIG. 9A is a fragmentary sectional view illustrating another example process for forming electro optical device of FIG. 5 according to one example embodiment.

FIG. 9 depicts one example process for forming substrate 330 for use as part of electro optical device 312 (as shown in FIG. 5) or for use as part of electro optical devices 312 and 312' of electro optical device 412 (as shown in FIG. 6). In particular, FIG. 9 illustrates embossers 731 and 733 which are configured to form grooves 50 and grooves 360 which are interdigitated or interleaved with one another in substrate 330. Substrate 330 may comprise or may be formed of the same general material described above with respect to FIG. 7A for substrate 130. In other embodiments, grooves 50 and 360 may be formed in substrate 330 by other techniques such as other material removal techniques, material additive techniques or molding. In those applications where embossing is not used to form grooves 50 and 360, substrate 330 may be formed from other transparent dielectric materials. Once grooves 50 and 360 have been formed, electrical conductors 32 and 34 may be formed along grooves 50 and 360 in a manner similar to that described above with respect to FIGS. 8B and 8C or in other matters. Thereafter, electro optical materials are deposited within grooves 50 and 360 and cover 38 and cover 142 are laminated or otherwise secured to substrate 330.

Figure 10A:
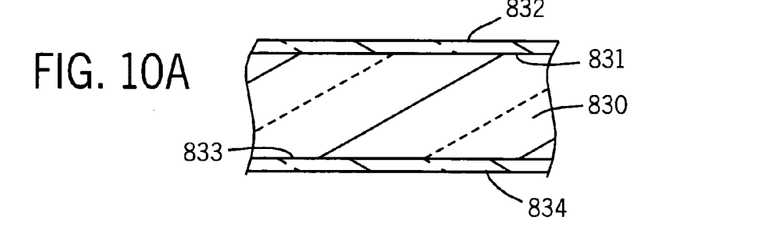
FIGS. 10A and 10B are fragmentary sectional views schematically illustrating another example of a process for forming the electro optical device of FIG. 2 according to one example embodiment.
Figure 10B:
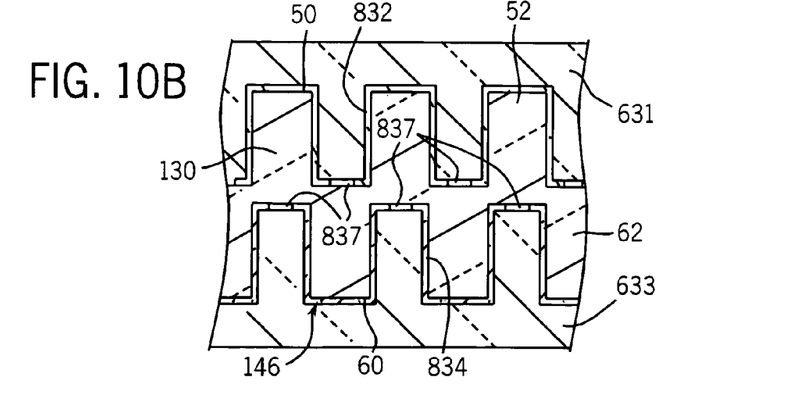

FIGS. 10A and 10B illustrate another example of a process for forming electro optical device 112 shown and described with respect to FIG. 2. As shown by FIG. 10, an embossable sheet, layer or mass 830 of transparent dielectric material which will form substrate 130 is provided. Thereafter, opposite faces 831 and 833 of mass 830 are coated or otherwise covered with transparent electrically conductive coatings 832 and 834, respectively, having lower elongation limits as compared to the material of mass 830. In one embodiment, mass 830 may be formed from a transparent dielectric polymeric material such as polyester terephthalate, polyethylene naphthalate, polyacrylate, polycarbonate, polyethylene, polypropylene and their copolymers. Coatings 832 and 834 may comprise transparent electrical conductive materials such as polyaniline, polyethoxydithiophene (PEDOT), submicron metallic or inorganic particles dispersed in a dielectric polymeric matrix.

As shown by FIG. 10B, embossers 631 and 633 are subsequently brought into engagement with mass 830 and coatings 832 and 834 of conductive material to emboss mass 830 so as to form substrate 130 having grooves 50 and 60 along faces 44 and 146, respectively. During embossing, the lower elongation limit of coatings 832 and 834 relative to that of mass 830 forming substrate 130 creates cracks 837 along floors 54 and 64 of grooves 50 and 60, respectively, to electrically isolate electrical conductors 32 and 34 extending over dividers 52 and 62 from electrical conductors extending over consecutive or adjacent dividers 52, 62. As a result, the use of photolithography to define conductors 32 and 34 upon substrate 130 may be reduced.

According to one example embodiment, the mass 830 of embossable material utilized in the process described in FIGS. 10A and 10B comprises polyethylene terephthalate (PET). In other embodiments, mass 830 may comprise other materials such as polyethylene naphthalate, polyacrylate, polycarbonate, polyethylene, polypropylene and their copolymers. According to one example embodiment, coatings 832 and 834 of transparent electrically conductive material which ultimately form conductors 32 and 34 may comprise polyaniline, polyethoxydithiophene (PEDOT), submicron metallic or inorganic particles dispersed in a dielectric polymeric matrix and have a substantial uniform coating thickness of at least about 100 nanometers, less than or equal to 10 microns and nominally 1 micron. In other embodiments, coatings 832 and 834 may comprise other materials having other uniform or non-uniform coating thicknesses such that cracks 837 are formed during embossing to isolate conductors 32 and 34 from selected other conductors 32 and 34. Although FIGS. 10A and 10B illustrate an example of a process for forming substrate 130 and conductors 32, 34 of electro optical device 112 shown and described with respect to FIG. 2, the process shown in FIGS. 10A and 10B may also be used to form substrate 330 and its electrical conductors 32 and 34 of electro optical device 312 shown and described with respect to FIG. 5.

Overall, electro optical devices 12, 112, 212, 312, 412 and 512 switch between different levels of opacity or different wave-length absorption states in less Overall, electro optical devices 12, 112, 212, 312, 412 and 512 switch between different levels of opacity or different wave-length absorption states in less time, with greater contrast and with reduced voltages. Because electrical conductors 32 and 34 are formed along sidewalls of grooves 50, 60 and 360, the spacing between conductors on opposites sides of each groove may be kept relatively small while the depth of such grooves may be relatively large. Because conductors 32 and 34 on opposite sides of each groove are closer together, stronger electrical fields may be created across the electro optical material in such grooves with lower voltages. The stronger electrical fields result in faster switching of the electro optical material between optical states. Because the depth of such grooves may be relatively large without increasing spacing between electrical conductors 32 and 34, the opacity of the electro optical material within such grooves when not experiencing an electric field may increase contrast. In addition, electro optical devices, 12, 112 212, 312, 412, and 512 are well suited for applications in which such devices are curved or are arcuate. Because electrical conductors 32 and 34 are relatively closely spaced and are formed along grooves 50, 60, 360, space in between such electrical conductors or electrodes is maintained in the curved state, resulting in greater color uniformity over the surface of such electro optical devices.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. An apparatus comprising:
   a substrate having a first face including a first groove therein, the first groove having a first floor, a first wall extending from the first floor and a second opposite wall extending from the first floor, wherein the first wall and the second wall are formed from a transparent dielectric material;
   a first electrical conductor on the first wall;
   a second electrical conductor on the second wall isolated from the first conductor; and
   a first electro optical material in the first groove.

2. The apparatus of claim 1 wherein the first face of the substrate has a second groove having a second floor, a third wall extending from the second floor and a fourth wall extending from the second floor, and wherein the apparatus further comprises:
   a third electrical conductor on the third wall;
   a fourth electrical conductor on the fourth wall and isolated from the third electrical conductor; and
   a second electro optical material in the second groove.

3. The apparatus of claim 2, wherein the second electrical conductor is electrically connected to the third electrical conductor.

4. The apparatus of claim 3, wherein the first face of the substrate includes a first divider between the first groove and the second groove and wherein the second electrical conductor and the third electrical conductor are provided by a layer of conductive material extending over the first divider from the first groove to the second groove.

5. The apparatus of claim 4, wherein the first face of the substrate further includes a third groove having a third floor, a fifth wall extending from the third floor and a sixth wall extending from the third floor and a second divider between the second groove and the third groove, wherein the apparatus further comprises:
   a fifth electrical conductor on the fifth wall;
   a sixth electrical conductor on the sixth wall and electrically isolated from the sixth wall; and
   a third electro optical material in the third groove, wherein the second electrical conductor and a third electrical conductor are provided by a second layer of conductive material extending over the second divider from the second groove to the third groove.

6. The apparatus of claim 2, wherein the substrate has a second opposite face including a third groove having a third floor, a fifth wall extending from the third floor and a sixth wall extending from the third floor and wherein the apparatus further comprises:
   a fifth electrical conductor on the fifth wall;
   a sixth electrical conductor on the sixth wall and isolated from the fifth electrical conductor; and
   a third electro optical material in the third groove.

7. The apparatus of claim 6, wherein the third groove is offset with respect to the first groove and the second groove.

8. The apparatus of claim 7, wherein the third groove is interdigitated between the first groove and the second groove.

9. The apparatus of claim 8, wherein the first face of the substrate includes a first divider between the first groove and the second groove, and wherein the second electrical conductor and the third electrical conductor are provided by a layer of conductive material extending over the first divider from the first groove to the second groove.

10. The apparatus of claim 9, wherein the second face includes a fourth groove having a fourth floor, a seventh wall extending from the fourth floor and an eighth wall extending from the fourth floor, and wherein the apparatus further comprises:
    a seventh electrical conductor on the seventh wall,
    an eighth electrical conductor on the eighth wall and isolated from the seventh electrical conductor; and
    a fourth electro optical material in the fourth groove.

11. The apparatus of claim 10, wherein the second groove is interdigitated between the third groove and the fourth groove.

12. The apparatus of claim 10, wherein the second face includes a second divider between the third groove and the fourth groove, and wherein the sixth electrical conductor and the seventh electrical conductor are provided by a layer of conductive material extending over the second divider from the third groove to the fourth groove.

13. The apparatus of claim 10, wherein the first groove and the second groove are parallel to one another.

14. The apparatus of claim 1, wherein the electro optical material is configured to change translucency in response to different charges applied across the material.

15. The apparatus of claim 1, wherein the substrate, the first electrical conductor, the second electrical conductor and the electro optical material form a pixel of a multi-pixel apparatus.

16. The apparatus of claim 1, wherein the first electrical conductor on the first wall is in the first groove.

17. The apparatus of claim 1, wherein the second electrical conductor is on a side of the second wall facing the first wall.

18. The apparatus of claim 1, wherein the first wall and the second wail are formed from a polymeric material selected from a group of polymeric materials consisting of: polyethylene terephthalate (PET), polyethylene naphthalate, polyacrylate, polycarbonate, polyethylene, polypropylene and their copolymers.

19. An apparatus comprising:
    a substrate having a first face including first grooves and a second face including second grooves out of phase with the first grooves:
    a first cover opposite the first grooves;
    a second cover opposite the second grooves;
    first and second opposite electrical conductors electrically isolated from one another along each of the first grooves and the second grooves; and
    an electro optical material in each of the first grooves and the second grooves.

20. The apparatus of claim 19, wherein the first and second opposite electrical conductors along each of the grooves are on the substrate in each of the first and second grooves.

21. The apparatus of claim 19, wherein each of the first and second grooves includes a floor, a first wall extending from the floor and a second wall extending from the floor, and wherein the first and second opposite electrical conductors along each of the first and second grooves extend along the first wall and the second wall, respectively.

22. The apparatus of claim 19, wherein the first grooves and the second grooves are interdigitated.

23. The apparatus of claim 19, wherein the first face of the substrate includes a divider between consecutive first grooves and wherein the first electrical conductor comprises a layer of electrically conductive material extending from within one first groove over the divider into another consecutive first groove.

24. The apparatus of claim 19, wherein the substrate, the first cover, the second cover, the first and second opposite electrical conductors and the electro optical material form a pixel of a multi-pixel apparatus.

25. An apparatus comprising:
a substrate having a first face including first grooves and a second face including second grooves out of phase with the first grooves;
a first electrical conductor on the substrate in each groove;
a second electrical conductor on the substrate in each groove, and electrically isolated from the first conductor; and
an-electro optical material in each of the grooves.

26. An apparatus comprising:
a substrate having a first face including first grooves and a second face including second grooves out of phase with the first grooves;
a first electrical conductor on the substrate in each groove;
a second electrical conductor on the substrate in each groove, and electrically isolated from the first conductor;
an electro optical material in each of the grooves; and
a switching device configured to selectively apply a voltage to the first electrical conductor in response to a control signal.

27. The apparatus of claim 26, wherein the substrate, first electrical conductor, the second electrical conductor and the electro-optical material form pixels along the first face and along the second face, wherein each of the first grooves and the second grooves has a floor and wherein each pixel includes a reflective surface opposite the floor.

28. The apparatus of claim 27, wherein one of the pixels has a reflective surface configured to absorb a first range of wavelengths and wherein another of the pixels has a reflective surface configured to absorb a second distinct range of wavelengths.

29. A method comprising:
forming first grooves in a first face of a substrate, each of the first grooves having a first floor, a first wall extending from the first floor and a second opposite wall extending from the first floor;
forming a first electrical conductor on the first wall;
forming a second electrical conductor on the second wall; and
depositing a first electro optical material in each of the first grooves.

30. The method of claim 29, wherein the substrate further includes a second face having second grooves, each of the second grooves including a second floor, a third wall extending from the second floor and a fourth wall extending from the second floor, and wherein the method further comprises:
forming a third electrical conductor on the third wall;
forming a fourth electrical conductor on the fourth wall isolated from the third electrical conductor; and
depositing a second electro optical material in the second grooves.

31. The method of claim 30, wherein the first grooves and the second grooves are out of phase.

32. The method of claim 31, wherein the first electro optical material has a first light absorption spectrum and wherein the second electro optical material has a second light absorption spectrum.

33. The method of claim 29, wherein forming the first grooves includes embossing the first grooves.

34. The method of claim 33, further comprising applying a conductive material to the substrate prior to embossing.

35. The method of claim 33, further comprising applying a conductive material to the substrate subsequent to embossing.

36. A method comprising:
providing a substrate having a face with grooves in the substrate and electro optical material in the grooves along the face; and
forming electric fields through the electro optical material between and with multiple pairs of electrodes across the face that are on opposite mutually facing sides of walls of the grooves.

37. An apparatus comprising:
a substrate having a face with grooves in the substrate;
electro optical material along the face in the grooves; and
means for forming electric fields through the electro optical material between multiple pairs of electrodes across the face that are on opposite mutually facing sides of walls of the grooves.

38. An apparatus comprising:
a substrate having a first face including first grooves and a second face including second grooves out of phase with the first grooves;
an electro optical material in each of the first grooves and the second grooves; and
means for applying an electrical field across the electro optical material in at least one of the first grooves and the second grooves.

39. A method comprising:
selectively charging conductors along opposing walls of grooves in a substrate to distinct voltages to selectively create electric fields across electro optical material within the grooves to vary translucency of the electro optical material; and
reflecting light through the electro optical material when the electro optical material is translucent.

40. An apparatus comprising:
a substrate having a face including a first groove therein, the first groove having a first floor, a first wall extending from the first floor and a second opposite wall extending from the first floor;
a first electrical conductor on the first wall;
a second electrical conductor on the second wall isolated from the first conductor; and
a first electro optical material in the first groove;
wherein the face of the substrate has a second groove having a second floor, a third wall extending from the second floor and a fourth wall extending from the second floor, and wherein the apparatus further comprises:
a third electrical conductor on the third wall;
a fourth electrical conductor on the fourth wall and isolated from the third electrical conductor; and
a second electro optical material in the second groove.

41. A method comprising:
providing a substrate having a first face including first grooves, each of the first grooves having a first floor, a first wall extending from the first floor and a second opposite wall extending from the first floor;

forming a first electrical conductor on the first wall;

forming a second electrical conductor on the second wall; and depositing a first electro optical material in each of the first grooves, wherein the substrate further includes a second face having second grooves, each of the second grooves including a second floor, a third wall extending from the second floor and a fourth wall extending from the second floor, and wherein the method further comprises:

forming a third electrical conductor on the third wall;

forming a fourth electrical conductor on the fourth wall isolated from the third electrical conductor; and depositing a second electro optical material in the second grooves.

42. An apparatus comprising:

a substrate having a face including a groove therein, the groove having a floor, a first wall extending from the floor and a second opposite wall extending from the floor;

a first electrical conductor on the first wall;

a second electrical conductor on the second wall isolated from the first conductor; and an electro optical material in the groove, wherein the first electrical conductor on the first wall is in the groove.

43. An apparatus comprising:

a substrate having a face including a groove therein, the groove having a floor, a first wall extending from the floor and a second opposite wall extending from the floor;

a first electrical conductor on the first wall;

second electrical conductor on the second wall isolated from the first conductor; and electro optical material in the groove, wherein the first wall and the second wall are formed from a polymeric material selected from a group of polymeric materials consisting of: polyethylene terephthalate (PET), polyethylene naphthalate, polyacrylate, polycarbonate, polyethylene, polypropylene and their copolymers.

* * * * *

UNITED STATES PATENT AND TRADEMARK OFFICE
CERTIFICATE OF CORRECTION

PATENT NO. : 7,382,522 B2  Page 1 of 1
APPLICATION NO. : 11/118209
DATED : June 3, 2008
INVENTOR(S) : Chinmay S. Betrabet It is certified that error appears in the above-identified patent and that said Letters Patent is hereby corrected as shown below:

In column 1, line 41, delete "FIG. 9A" and insert -- FIG. 9 --, therefor.

In column 9, line 8, delete "optional" and insert -- optical --, therefor.

In column 13, line 25, in Claim 2, after "claim 1" insert -- , --.

In column 14, line 15, in Claim 10, delete "wall," and insert -- wall; --, therefor.

In column 14, line 44, in Claim 18, delete "wail" and insert -- wall --, therefor.

In column 14, line 52, in Claim 19, after "grooves" delete ":" and insert -- ; --, therefor.

In column 15, line 23, in Claim 25, delete "an-electro" and insert -- an electro --, therefor.

In column 18, line 13, in Claim 43, insert -- a -- before "second".

In column 18, line 15, in Claim 43, insert -- an -- before "electro".

Signed and Sealed this

Fourth Day of November, 2008

JON W. DUDAS
*Director of the United States Patent and Trademark Office*